United States Patent
Begeja et al.

(10) Patent No.: US 10,325,143 B2
(45) Date of Patent: Jun. 18, 2019

(54) METHOD AND SYSTEM FOR AGGREGATING VIDEO CONTENT

(71) Applicant: AT&T Intellectual Property I, L.P., Atlanta, GA (US)

(72) Inventors: Lee Begeja, Gillette, NJ (US); Zhu Liu, Marlboro, NJ (US); Yadong Mu, Middletown, NJ (US); Bernard S. Renger, New Providence, NJ (US); David Crawford Gibbon, Lincroft, NJ (US); Behzad Shahraray, Holmdel, NJ (US); Raghuraman Gopalan, Dublin, CA (US); Eric Zavesky, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/886,027

(22) Filed: Feb. 1, 2018

(65) Prior Publication Data
US 2018/0157895 A1    Jun. 7, 2018

Related U.S. Application Data

(63) Continuation of application No. 15/227,151, filed on Aug. 3, 2016, now Pat. No. 9,916,493.

(51) Int. Cl.
  *G06K 9/00*    (2006.01)
  *H04N 7/18*    (2006.01)
  (Continued)

(52) U.S. Cl.
  CPC ..... *G06K 9/00221* (2013.01); *G06K 9/00288* (2013.01); *G06K 9/00684* (2013.01);
  (Continued)

(58) Field of Classification Search
  USPC .......................................................... 382/118
  See application file for complete search history.

(56) References Cited

U.S. PATENT DOCUMENTS

| 6,097,429 A | 8/2000 | Seeley et al. |
| 7,710,452 B1 | 5/2010 | Lindberg et al. |
| (Continued) | | |

FOREIGN PATENT DOCUMENTS

| EP | 3016080 | 5/2016 |
| WO | 2012149336 A2 | 11/2012 |
| (Continued) | | |

OTHER PUBLICATIONS

"Canary Adds Breakthrough Learning Features and Announces Wink Integration", Nov. 27, 2015.
(Continued)

*Primary Examiner* — Jerome Grant, II
(74) *Attorney, Agent, or Firm* — Guntin & Gust, PLC; Mark Wilinski

(57) ABSTRACT

Aspects of the subject disclosure may include, for example, systems and methods aggregating video content and adjusting the aggregate video content according to a training model. The adjusted aggregate video content comprises a first subset of the images and does not comprise a second subset of the images. The first subset of the images is determined by the training model based on a plurality of categories corresponding to a plurality of events. The illustrative embodiments also include presenting the adjusted aggregate video content and receiving identifications for the first subset of the images in the aggregate video content. Further, the illustrative embodiments include adjusting the training model according to the identifications and providing the adjusted training model to a network device. Other embodiments are disclosed.

20 Claims, 10 Drawing Sheets

(51) Int. Cl.
*G06T 7/20* (2017.01)
*G11B 27/028* (2006.01)
*G11B 27/031* (2006.01)

(52) U.S. Cl.
CPC ...... *G06K 9/00711* (2013.01); *G06K 9/00771* (2013.01); *G06T 7/20* (2013.01); *G11B 27/028* (2013.01); *G11B 27/031* (2013.01); *H04N 7/181* (2013.01); *G06K 2009/00738* (2013.01); *G06T 2207/20081* (2013.01); *G06T 2207/30201* (2013.01)

(56) References Cited

U.S. PATENT DOCUMENTS

| | | | |
|---|---|---|---|
| 8,004,563 B2 | 8/2011 | Talmon et al. | |
| 8,167,430 B2 | 5/2012 | Cobb et al. | |
| 8,170,283 B2 | 5/2012 | Cobb et al. | |
| 8,180,105 B2 | 5/2012 | Cobb et al. | |
| 8,224,027 B2 | 7/2012 | Kim et al. | |
| 8,355,997 B2 | 1/2013 | Kirshenbaum et al. | |
| 8,411,935 B2 | 4/2013 | Urech et al. | |
| 8,547,437 B2 | 10/2013 | Buehler et al. | |
| 8,589,402 B1 | 11/2013 | Iampietro et al. | |
| 8,711,217 B2 | 4/2014 | Venetianer et al. | |
| 8,750,513 B2 | 6/2014 | Renkis et al. | |
| 8,781,293 B2 | 7/2014 | Lin et al. | |
| 8,811,673 B1 | 8/2014 | Wang et al. | |
| 8,847,771 B2 | 9/2014 | Backs et al. | |
| 8,913,147 B2 | 12/2014 | Escobedo | |
| 8,949,235 B2 | 2/2015 | Ratovitch et al. | |
| 8,984,406 B2 | 3/2015 | Kalaboukis et al. | |
| 8,990,877 B2 | 3/2015 | Hart et al. | |
| 9,024,779 B2 | 5/2015 | Kuhn et al. | |
| 9,213,903 B1 | 12/2015 | Laska et al. | |
| 9,215,467 B2 | 12/2015 | Cheok et al. | |
| 9,317,753 B2 | 4/2016 | Saptharishi et al. | |
| 9,325,951 B2 | 4/2016 | Saptharishi | |
| 9,386,282 B2 | 7/2016 | Hazzani | |
| 9,473,809 B2 | 10/2016 | Fan et al. | |
| 9,576,607 B2 | 2/2017 | Leske | |
| 9,619,488 B2 | 4/2017 | Pathak et al. | |
| 9,762,848 B2 | 9/2017 | Nowakowski et al. | |
| 9,779,164 B2 | 10/2017 | Barbieri et al. | |
| 9,984,466 B1* | 5/2018 | Duran | G06T 7/0022 |
| 2003/0174783 A1 | 9/2003 | Rahman et al. | |
| 2006/0053342 A1* | 3/2006 | Bazakos | G06K 9/00335 714/37 |
| 2006/0078047 A1 | 4/2006 | Shu et al. | |
| 2007/0192351 A1 | 8/2007 | Liu et al. | |
| 2010/0150403 A1 | 6/2010 | Cavallaro et al. | |
| 2011/0058034 A1 | 3/2011 | Grass et al. | |
| 2012/0188370 A1* | 7/2012 | Bordonaro | G08B 13/19682 348/143 |
| 2014/0105573 A1 | 4/2014 | Hanckmann et al. | |
| 2016/0012609 A1 | 1/2016 | Jason | |
| 2016/0212329 A1* | 7/2016 | Choe | H04N 5/23245 |
| 2017/0371701 A1* | 12/2017 | Doshi | G06F 3/061 |
| 2018/0129882 A1* | 5/2018 | Seeber | G06K 9/00771 |

FOREIGN PATENT DOCUMENTS

| | | |
|---|---|---|
| WO | 2013101460 A2 | 7/2013 |
| WO | 2013117801 A1 | 8/2013 |
| WO | 2014081726 A1 | 5/2014 |
| WO | 2014121340 A1 | 8/2014 |

OTHER PUBLICATIONS

Collins, Robert, "Introduction to the Special Section on Video Surveillance", Dec. 2010.
Jiang, Fan, "Abnormal Event Detection From Surveillance Video by Dynamic Hierarchical Clustering", 2007.
Lintz, Nathan, "Exploring Computer Vision (Part III): Improving Security Cameras with Machine Learning", Feb. 29, 2016.
Piciarelli, "On-line trajectory clustering for anomalous events detection", 2006, Dec. 2006.

* cited by examiner

300

400

900

METHOD AND SYSTEM FOR AGGREGATING VIDEO CONTENT

CROSS-REFERENCE TO RELATED APPLICATIONS

This application is a Continuation of U.S. patent application Ser. No. 15/227,151 filed on Aug. 3, 2016. The contents of the foregoing is hereby incorporated by reference into this application as if set for herein in full.

FIELD OF THE DISCLOSURE

The subject disclosure relates to a method and system for aggregating video content.

BACKGROUND

Both commercial and residential premises have "smart home" capabilities that include sensors and cameras that provide information to a "smart home" subscriber associated with the premises. Such information can include images from the cameras, motion sensor information, heat sensor information, appliance sensor information, acoustic sensor information, etc. The large amount of information can be aggregated by a premises device and presented to the "smart home" subscriber for review.

BRIEF DESCRIPTION OF THE DRAWINGS

Reference will now be made to the accompanying drawings, which are not necessarily drawn to scale, and wherein.

DETAILED DESCRIPTION

Figure 1:
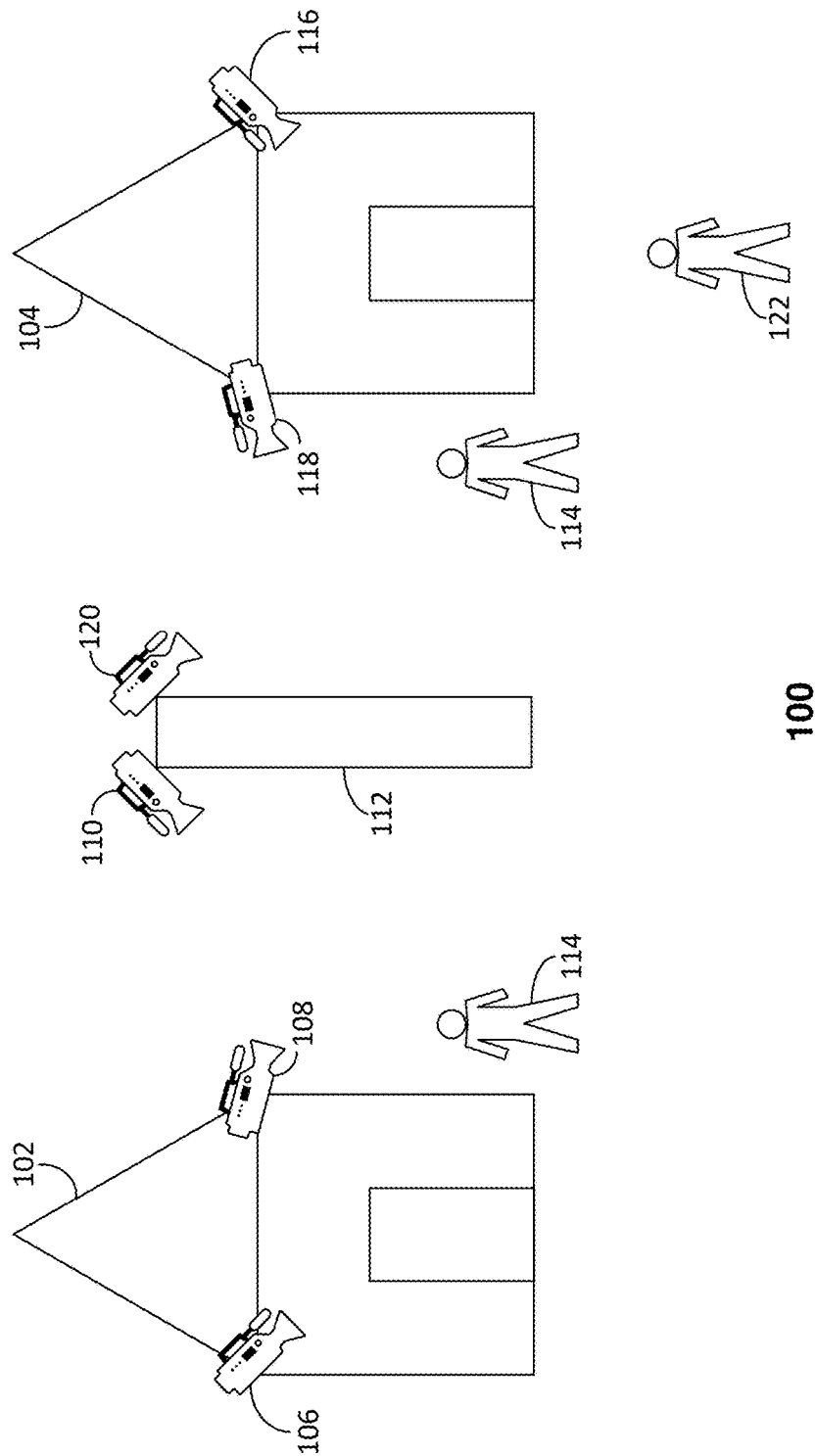
FIGS. 1-2 depict illustrative embodiments of systems for aggregating video content.

The subject disclosure describes, among other things, illustrative embodiments for aggregating video content and adjusting the aggregate video content according to a training model. The adjusted aggregate video content comprises a first subset of the images and does not comprise a second subset of the images. The first subset of the images is determined by the training model based on a plurality of categories corresponding to a plurality of events. The illustrative embodiments also include presenting the adjusted aggregate video content and receiving identifications for the first subset of the images in the aggregate video content. Further, the illustrative embodiments include adjusting the training model according to the identifications and providing the adjusted training model to a network device. Other embodiments are described in the subject disclosure.

One or more aspects of the subject disclosure include a device comprising a processing system including a processor and a memory that stores executable instructions that, when executed by the processing system, facilitate performance of operations. The operations can include receiving video content from each of a plurality of cameras oriented toward a current premises resulting in a plurality of video content. The plurality of video content comprises images of a plurality of events. Further operations can include aggregating the plurality of video content to generate aggregate video content and applying a selected training model to the aggregate video content resulting in adjusted aggregate video content. The adjusted aggregate video content comprises a first subset of the images and does not comprise a second subset of the images. The first subset of the images is determined by the selected training model based on a plurality of categories corresponding to the plurality of events. Additional operations can include presenting the adjusted aggregate video content and receiving user-generated input for the adjusted aggregate video content. The user-generated input provides identifications for the first subset of the images in the aggregate video content. Also, the operations can include adjusting the selected training model according to the user-generated input resulting in an adjusted training model and providing the adjusted training model to a network device.

One or more aspects of the subject disclosure include a machine-readable storage medium, comprising executable instructions that, when executed by a processing system including a processor, facilitate performance of operations. Operations can include receiving a plurality of video content associated with a current premises. The plurality of video content comprises images of a plurality of events. Further operations can include aggregating the plurality of video content to generate aggregate video content and applying a selected training model to the aggregate video content resulting in adjusted aggregate video content. The adjusted aggregate video content comprises a first subset of the images and does not comprise a second subset of the images. The first subset of the images is determined by the selected training model based on a plurality of categories corresponding to the plurality of events. The selected training model is selected according to a plurality of characteristics of the current premises. Additional operations can include presenting the adjusted aggregate video content and receiving user-generated input for the adjusted aggregate video content. The user-generated input provides identifications for the first subset of the images in the aggregate video content. Also, the operations can include adjusting the selected training model according to the user-generated input resulting in an adjusted training model and providing the adjusted training model to a network device.

One or more aspects of the subject disclosure include a method. The method can include receiving, by a processing system including a processor, video content from each of a plurality of cameras oriented toward a current premises. The plurality of video content comprises images of a plurality of events. Further, the method can include aggregating, by the processing system, the plurality of video content to generate aggregate video content. In addition, the method can include adjusting, by the processing system, the aggregate video content resulting in adjusted aggregate video content according to a training model. The adjusted aggregate video content comprises a first subset of the images and does not comprise a second subset of the images. The first subset of the images is determined by the training model based on a plurality of categories corresponding to the plurality of events. Also, the method can include presenting, by the processing system, the adjusted aggregate video content and receiving, by the processing system, identifications for the first subset of the images in the aggregate video content. Further, the method can include adjusting, by the processing system, the training model according to the identifications resulting in an adjusted training model and providing, by the processing system, the adjusted training model to a network device.

Figure 2:
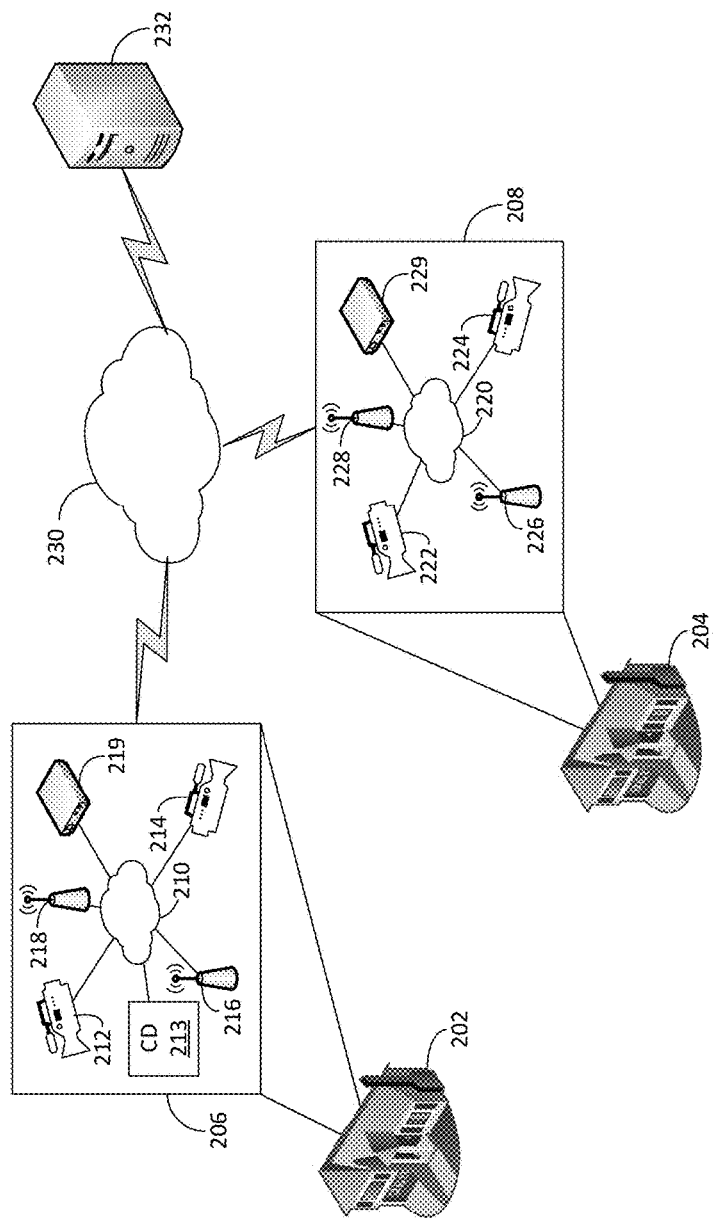

FIGS. 1-2 depict illustrative embodiments of systems 100 and 200 for aggregating video content. Referring to FIG. 1, in one or more embodiments, premises 102 and 104, such as a home, commercial building, or government office, may have an arrangement of surveillance cameras 106, 108, 116, and 118 that captures video content of the premises and its surroundings throughout a day. The video content can be in the form of images, portions of video, audio, or a combination thereof.

In one or more embodiments, a camera 106 and 116 can capture and record video content near the front door of the premises. Camera 108 and 118 can capture and record video content of the surroundings of the premises. Further, surveillance cameras 110 and 120 within a neighborhood of the premises 102 and 104 can also capture and record video content of the surroundings of the premises 102 and 104. Surveillance cameras 110 and 120 may be fixed on a city lamp post 112 and can be operated by a third party such as a local municipality agency. The cameras 106, 108, 116, and 118 can store captured video content in a database accessible by a premises device that controls operation of the cameras 106, 108, 116, and 118. Further, cameras 110 and 120 can forward captured video content of the surroundings of the premises 102 and 104 over a communication network to the database accessible by the premises device. Note, the database can be located on the premises 102 and 104 or in a cloud network.

In one or more embodiments, the system 100 records video content captured by cameras 106, 108, 110, 116, 118, and 120 throughout each day. The premises device can present the entirety of the captured video content to a user of the system 100 (e.g. the premises owner) to review. However, reviewing 24 hours of video from each camera 106, 108, 110, 116, 118, and 120 is a cumbersome task for the user. Thus, system 100 reduces the amount of video content for a user to review using the techniques described herein.

In one or more embodiments, the system 100 detects whether an event in the captured video content occurred during a time period, using a premises computing device (e.g. premises device). An event can be movement of an object. For example, the premises device can detect a person 114 and 122 moving in the surroundings of the premises. Thus, the premises device can provide the user to review recorded video content that only contains events (e.g. motion of a person). The premises device can use image processing techniques to detect motion of objects in the captured aggregate video content to adjust or reduce the aggregate video content.

However, the amount of video content to review by the user can still be cumbersome given that there are multiple cameras each have multiple events to review. Therefore, the premises device adjusts or reduces the amount of the video content by identifying and categorizing the events. That is, by premises device classifying events into categories, and only presenting the user to review events from certain categories, reduces the amount of captured video content for the user to review. For example, the premises device can be configured to detect not only movement of person 114 but also whether that person 114 is known and regularly visits the premises 102 and 104. If so, the premises device can discard video content containing the person 114 for the user to review. For example, person 114 can be a mailman. Thus, responsive to detecting that the person 114 is the mailman within the captured video content, the premises device can discard the portion of the video content containing images of the mailman 114. However, if the premises device detects a person 122 within the captured video content, but is not able to identify the person 122 (i.e. a stranger) then the premises device presents the portion of the video content containing images of person 122 to the user for review.

Referring to FIG. 2, system 200 aggregates video content captured by premises surveillance cameras for review by a user. In one or more embodiments, each premises 202 and 204 can have multiple surveillance cameras 212, 214, 222, and 224 as part of a "smart" home system 206 and 208. A "smart" home system is the use of data collected from cameras and sensors placed within and surrounding a premises to automatically provide services to improve the user's quality of life. Such a "smart" home system can be controlled or managed by a premises device 219 and 229.

The premises device 219 and 229 are communicatively coupled over a communication network 210 and 220 to the cameras 212, 214, 222, and 224 as well as motion sensors 216, 218, 226, and 228. The premises device 219 and 229 collects data from and manages or controls cameras 212, 214, 222, and 224 and motion sensors 216, 218, 226, and 228 over the communication network 210 and 220. Further, the communication network 210 and 220 can be a wireless network (e.g. WiFi) or a wired network (e.g. Ethernet). Further, the premises device 219 and 229 can be communicatively coupled to a network device such as a computer server 232 over a communication network (e.g. Internet, cloud network, etc.).

In one or more embodiments, the surveillance cameras 212, 214, 222, and 224 capture video content of the premises 202 and 204 and its surroundings. The premises device 219 and 229 aggregates the video content for presentation to the user for review. However, the amount of aggregate video content can be cumbersome for the user to review. Thus, premises device 219 and 229 adjusts the aggregate video content by reducing the amount of aggregate video content for the user to review. Prior to reducing the aggregate video content, the premises device 219 and 229 identifies or detects events in the aggregate video content. In some embodiments, the premises device 219 and 229 can detect events by detecting motion with a portion of the aggregate video content. In other embodiments, the premises device 219 and 229 detects motion using image processing techniques on the aggregate video content. In further embodiments, the premises device 219 and 229 can use data from motion sensors 216, 218, 226 and 228 that are coupled to the premises device 219 and 229 to detect events within the aggregate video content. That is, the motions sensors 216, 218, 226 and 228 can be located near the cameras 212, 214, 222, and 224 such that the area that each sensor can detect motion in an area that overlaps with the viewing area of each camera. Further, the motion sensors 216, 218, 226, and 228 can provide the premises device 219 and 229 with a time period that a sensor 216, 218, 226, and 228 detects motion for the premises device 219 and 229 to identify the portion of the video content captured by a camera 212, 214, 222, and 224 over same time period as an event.

In one or more embodiments, the aggregate video content that corresponds to the identified events can be too cumbersome for a user to review. Thus, the premises device 219 and 229 can apply a training model to the aggregate video content to adjust or reduce the aggregate video content. A training model identifies events that do not need to be reviewed by the user because they are ordinary events due to the characteristics of the premises 202 and 204 and its neighborhood. For example, if an applied training model is for an urban environment, then a taxi cab parked in front of the premises 202 and 204 would be classified as a typical event that would be discarded from the adjusted aggregate video content presented to the user to review. However, if the applied training model is for a suburban environment, then a taxi cab parked in front of the premises 202 and 204 would be classified as not a typical event that is kept in the adjusted aggregate video content presented to the user to review.

In one or more embodiments, the training model can be provided to the premises device 219 229 by the server 232 according to characteristics of the premises 202 and 204. In some embodiments, the server 232 can provide multiple training models to premises device 219 and 229. The premises device 219 and 229 can list the training models on a user interface of a communication device 213 for the user to select to apply to the aggregate video content. In further embodiments, one or more of the multiple training models is from a third party premises device and the third party premises is associated with the premises. For example, one of the training models received by premises device 219 from the server 232 may have been generated and provided by premises device 229 located within a premises 204, which is a neighbor to premises 202. The training model can include identifications of images that can be used by the premises device 219 to adjust/reduce the aggregate video content. For example, the training model provided by premises device 229 may include identification of a new neighbor. When premises 219 applies the training model with the identification of the new neighbor to the aggregate video content, the premises device 219 can discard images that contain the new neighbor from the aggregate video content, thereby reducing the aggregate video content and lessening the burden of the user's review.

In one or more embodiments, applying of the training model, by the premises device 219 and 229, to the aggregate video content includes analyzing the images of the events and classifying the images of events into categories. Analyzing the images can include identifying motion of an object, such as a person, in one of the images. Classifying the images into categories can include determining whether the person can be associated with the premises 202 and 204. For example, the person could be the neighborhood mailman. The premises device 219 and 229 can use facial recognition or image processing techniques to determine whether the person is associated with the premises 202 and 204. Further, if it is determined that the person is not associated with the premises 202, then an alarm notification can be transmitted by the premises device 219 to the user's communication device 213 notifying the user.

In one or more embodiments, after adjusting/reducing the aggregate video content by applying the training model, the premises device 219 and 229 can determine a size of the adjusted/reduced aggregate video content is above predetermined threshold. If it is determined that the size of the adjusted/reduced aggregate video content is above the predetermined threshold, then the premises device 219 and 229 can apply another training model to further adjust/reduce the aggregate video content. The premises device 219 and 229 can continue to apply training models until the adjusted/reduced aggregate video content is of a size less than a predetermined threshold. In some embodiments, the predetermined threshold can be configured by server 232, or the user. In other embodiments, the predetermined threshold can be identifies by a user previous behavior patterns in reviewing adjusted aggregate video content. That is, the premises device 219 and 229 can average the amount of time a user has reviewed adjusted aggregate video content in the past and configure the predetermined threshold that correspond to the average amount of time needed for the user to review. For example, previously, the premises device 219 and 229 has recorded that a user can only spend 10 minutes at a time to review adjusted aggregate video content. Thus, the premises device 219 and 229 can configure the predetermined threshold to a size of the adjusted aggregate video content corresponding to 10 minutes of review time. In some embodiments, the premises device 219 and 229 can determine that the aggregate video content cannot be adjusted or reduced to be a size lower than the predetermined threshold. Thus, an alarm notification can be sent to a communication device 213 of the user notifying that the size of the adjusted aggregate video content is more than the predetermined threshold.

In one or more embodiments, the adjusted or reduced aggregate video content is presented to the user on the communication device 213. The adjusted aggregate video content includes a set of images for the user to review. The user, via a user interface, provides identifications for the set images. For example, an image can be of a new neighbor. Thus, the user provides identification information for the image that the person in the image is the new neighbor.

In one or more embodiments, the training model is adjusted based on the identifications for the set of images. Thus, for example, when the adjusted training model is applied to images in any aggregate video content in the future, the premises device 219 and 229 would be able to identify the new neighbor and discard images of the new neighbor when adjusting any future aggregate video content. Further, the adjusted training model is provided to the server 232. Thus, if the adjusted training model is provided by premises device 219, then the server can share the adjusted training model with premises device 229 associated with another neighbor to identify the new neighbor when applied to any aggregate video content in the future. In other embodiments, the premises device 219 and 229 can generate a new training model based on the identification information for the images and provide the new training model to the server 232. Further, the server 232 can share the new training model with other premise devices.

The training models can utilize several techniques to adjust or reduce the aggregate video content. These techniques include using one or any combination of supervised machine learning, video clustering, and active learning. Such techniques incorporate the identifications of the images provided in the user-generated input to adjust/reduce future aggregate video content. Additional techniques, such as supervised machine learning, can include presenting representative portions of the aggregate video content to the user. Moreover, the user can associate each representative portion to either a pre-defined event or a new event, thereby generating a new training model or adjusting an existing training model. That is, if any future aggregate video content contains portions similar to the representative portion, then the premises device 219 and 229 can classify the portion to the pre-defined event or new event, accordingly. In using video clustering techniques, similar portions of the aggregate video content are grouped together. Representative examples of each group are presented to user to review instead of the entirety of the group, thereby lessening the user's review. In using active learning techniques, representative examples of portions of the aggregate video content are selected. These representative examples are called support vectors. Support vector machines (SVM) can be used to determine support vectors. Further, support vector machines can be used to generate supervised training models based on training examples. Applying such models to the aggregate video content classifies events into categories according to the training examples. Within supervised machine learning, video clustering, and active learning, further techniques can be used to adjust/reduce the aggregate video content. For example, scale-invariant feature transforms can be used to detect and describe local features in images to detect which images within the captured video content contain an event. A further example can be using spatiotemporal interest point techniques that detect action or motion within images to assist in detecting events within the aggregate video content.

Figure 3:
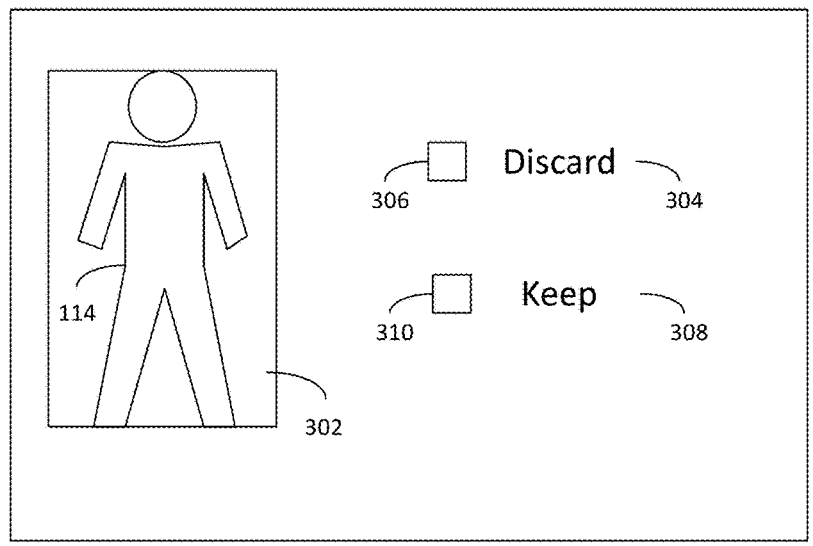
FIGS. 3-7 depict illustrative embodiments of user interfaces that are used in systems for aggregating video content.

FIGS. 3-7 depict illustrative embodiments of user interfaces that are used in systems for aggregating video content in FIGS. 1-2. Referring to FIG. 3, the premises device 219 can present images of adjusted aggregate video content on a user interface 301 for a user to review on the communication device 213. An image 302 can include an image of a person 114. Further, the user interface 300 may also include boxes 306 and 310 that can be checked to discard 304 or keep 308 the image 302 in when adjusting aggregate video content in the future. For example, the person 114 can be the neighborhood mailman. The user can identify the person 114 is known and indicate, via the user interface 300. Further, based on the user input and the identification of the person 114, the training model applied to the aggregate video content is adjusted. Thus, when applying the adjusted training model to any future aggregate video content, an image of person 114 within any future aggregate video content is discarded. This makes the review any future aggregate video content less cumbersome to the user.

Figure 4:
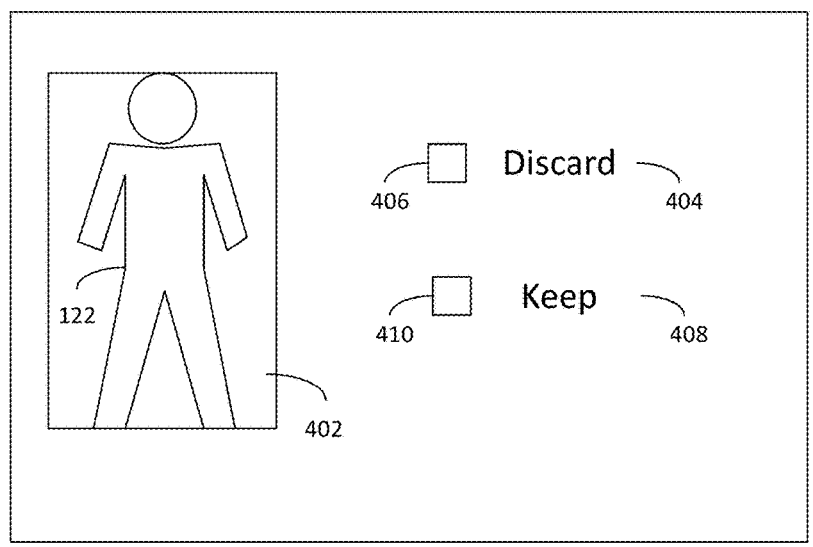

Referring to FIG. 4, the premises device 219 can present images of adjusted aggregate video content on a user interface 401 for a user to review on the communication device 213. An image 402 can include an image of a person 122. Further, the user interface 400 may also include boxes 406 and 410 that can be checked to discard 404 or keep 408 the image 402 in when adjusting aggregate video content in the future. For example, the person 122 can be a stranger that the user does not know and finds suspicious. Thus, when applying the adjusted training model to any future aggregate video content, an image of person 122 within any future aggregate video content is kept to be reviewed by the user.

Figure 5:
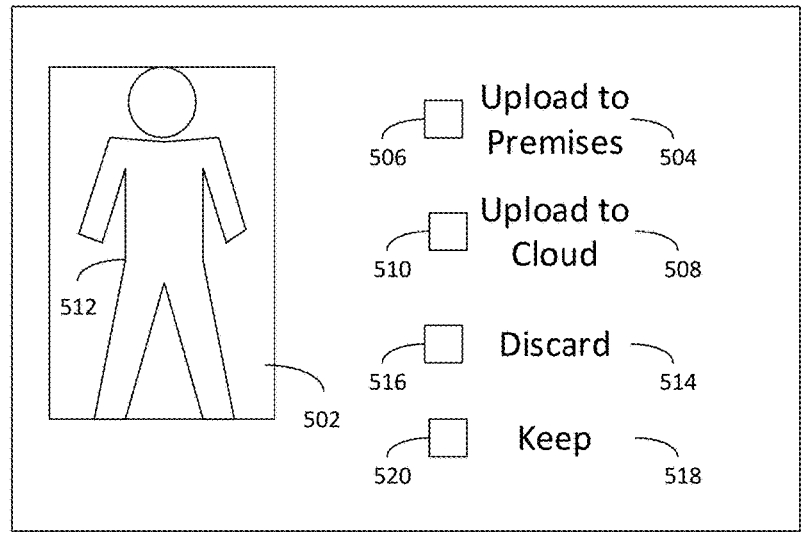

Referring to FIG. 5, a user interface 500 on the communication device 213 presents an image 502 of a person. The image 502 can be captured by a camera communicatively coupled to the communication device 213 or otherwise provided to the communication device 213. Further, user interface 500 includes boxes 506 and 510 that can be checked to upload the image 502 to the premises device 219 or to server 232. In addition, the user interface 500 allows the user to indicate whether to discard 514 or keep 520 images of person 512 using a check boxes 516 and 520 in adjusting of any future aggregate video content. For example, if person 512 is the new nanny for the neighbor, the user can indicate to discard images containing person 512 in any future aggregate video content. In another example, if person 512 is a suspected criminal, the user can indicate to keep images containing person 512 in any future aggregate video content for the user to review. The premises device 219, responsive to receiving the image 502 adjusts the training model(s) that would be applied to any future aggregate video content, accordingly as described herein.

Figure 6:
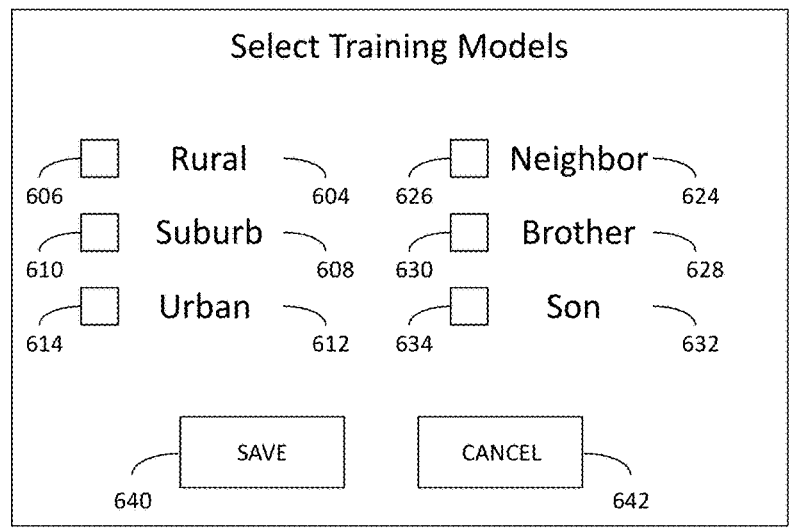

Referring to FIG. 6, a user interface 600 can be presented on the communication device 213 for a user to select one or more training models 604, 608, 612, 624, 628, and 632 using check boxes 606, 610, 614, 626, 630, and 634. For example, if the user is selecting training models to be applied to aggregate video content captured at a premises in an urban environment, then the user can select a training model associated with an urban environment. Such a training model can discard images that are typically found in urban environments when adjusting aggregate video content for the user to review. For example, the training model can discard images for the user to review that contain of parked taxi cabs in front of the premises. Further, the user can select training models associated with the user's neighbor 624, brother 628, and son 632. Such training models can include discarding images of people within the households of the neighbor, brother, and son in adjustment of any future aggregate video content. After selecting the training models, the user can save 640 or cancel 642 the selections. After the selected training models are saved, the premises device 219 can apply the selected training models in adjusting any future aggregate video content.

Figure 7:
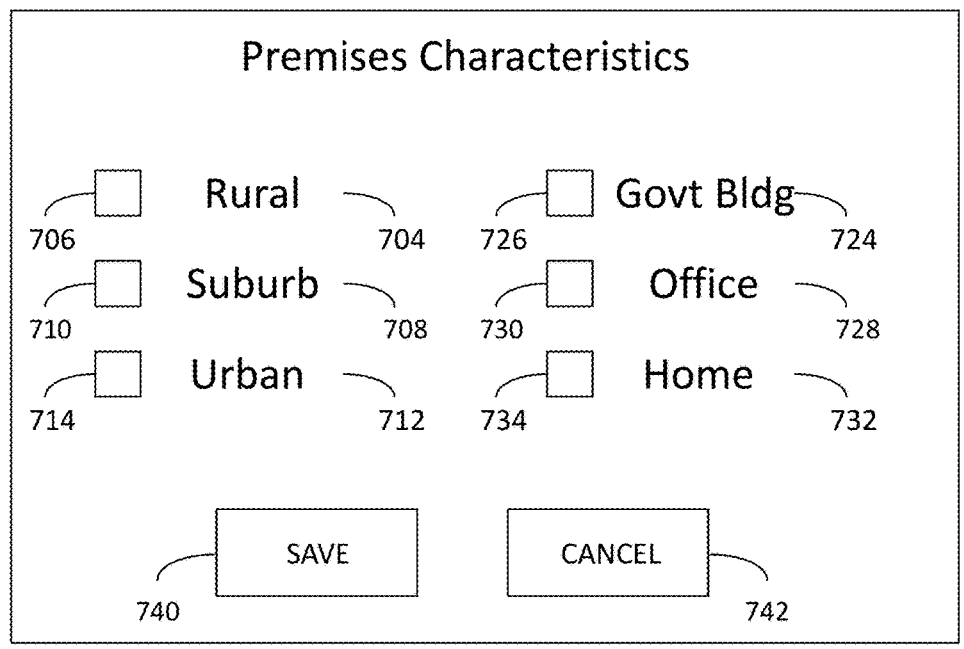

Referring to FIG. 7, a user interface 700 can present a list of characteristics of a premises for a user to select using check boxes. 706, 710, 714, 726, 730, and 734. These characteristics can include the premises being rural 704, suburban 708, urban 712, a government building 724, office 728, or a home 732. After selecting the characteristics, the user can save 740 or cancel 742 the selections. After the characteristics are saved, the characteristics are provided to the premises device 219 or to the server 232. The premises device 219 or the server 232 can select a training model according to the saved characteristics, and apply the selected training model in adjusting any future aggregate video content.

Figure 8:
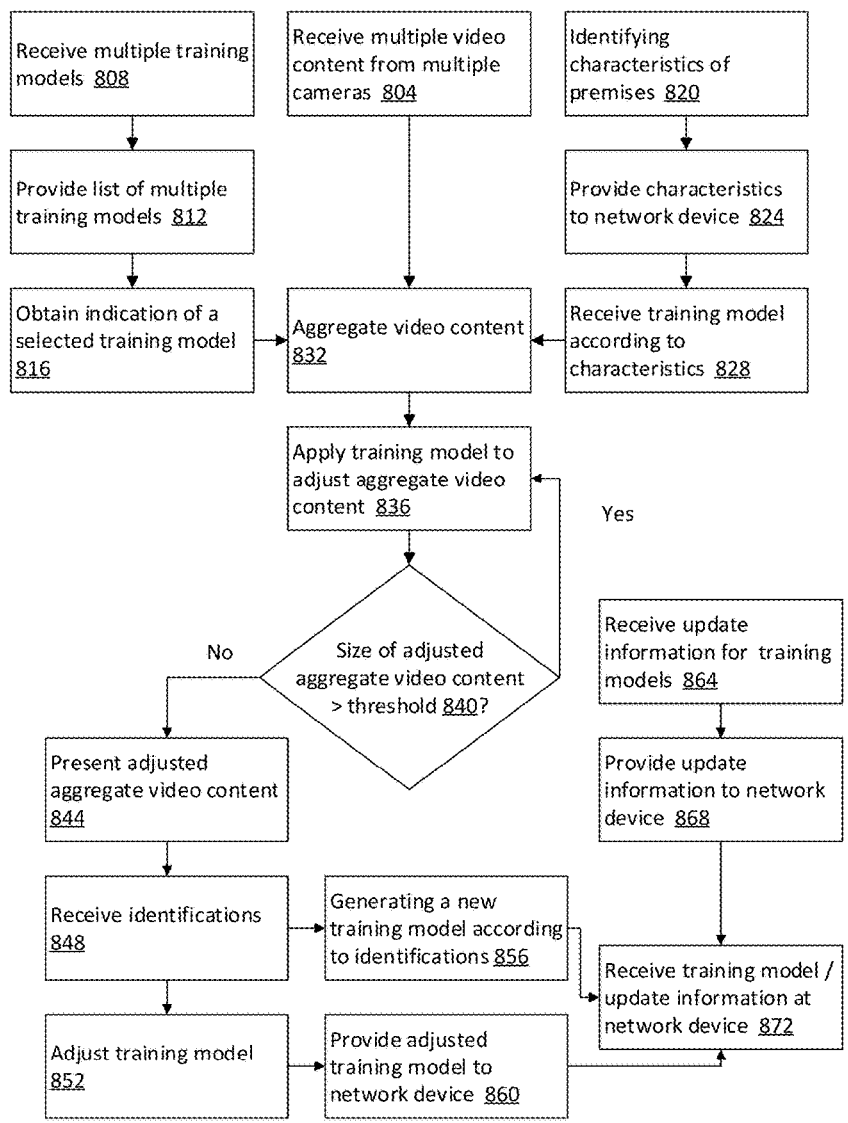
FIG. 8 depicts an illustrative embodiment of a method for aggregating video content used in portions of the systems described in FIGS. 1-2.

FIG. 8 depicts an illustrative embodiment of a method 800 used by systems 100 and 200 in FIGS. 1-2. At a step 804, the method 800 can include receiving video content from each of a multiple of cameras oriented toward a premises by a premises device 219 resulting in multiple video content. The multiple video content comprises images of multiple events. At step 832, the method 800 can also include aggregating the multiple video content by the premises device 219. Prior to aggregating the video content, at step 808, the method 800 can include receiving multiple, selectable training models from a server 232 by premises device 219. In some embodiment, at least one of the selectable training models is generated by the premises device 229 of a third party premises associated with the current premises (e.g. neighbor, parent, children, sibling, etc.). At a step 812, the method 800 can include providing a list of the multiple selectable training models to the user interface on the communication device 213 by the premises device 219. Further, at step 816, the method 800 can include obtaining an indication of the selected training model from the list of the plurality of selectable training models via the user interface by the premises device.

At a step 820, the method 800 can include identifying a plurality of characteristics for the current premises by the premises device. For example, the premises device can provide a list of selectable characteristics of the premises on a user interface of the communication device 213 to the user. Further, the user can select the characteristics that apply to the premises on the user interface and the user interface provides the selected characteristics to the premises device 219. At step 824, the method 800 can include providing the plurality of characteristics to the server 232 by the premises device 219. In addition, at step 828, the method 800 can include receiving the selected training model from the server 232 according to the plurality of characteristics by the premises device 219.

At step 836, the method 800 can include applying the selected training model to adjust the aggregate video content by the premises device 219. The adjusted aggregate video content comprises a first subset of the images and does not comprise a second subset of the images from the aggregate video content. Further, the first subset of the images is determined by the selected training model based on a plurality of categories corresponding to the plurality of events. The method 800, at step 840, can include determining, by the premises device 219, whether a size of the adjusted aggregate video content is above a predetermined threshold. If so, then the method 800 can include applying another training model to adjust or reduce the size of the aggregate video content by the premises device 219. If not, then the method 800, at step 844, can proceed to presenting, by the premises device 219, the adjusted aggregate video content on a user interface of the communication device for the user to review. At step 848, the method 800 can also include receiving user-generated input for the adjusted aggregate video content by the premises device 219. The user-generated input can provide identifications for the first subset of the images in the adjusted aggregate video content. At step 852, the method 800 can further include adjusting the selected training model according to the user-generated input by the premises device 219. At step 860, the method 800 can additionally include providing the adjusted training model to the server 232 by the premises device 219.

At step 856, the method 800 can include generating, by the premises device 219, a new training model according to the identifications for the first subset of the images. At step 872, the method 800 includes the server 232 receiving the new training model from the premises device 219.

Further, at step 854, the method 800 can include receiving update information for the plurality of selectable training models by the premises device 219 from a user interface on the communication device 213. At step 858, the method 800 can include providing the update information to the server 232 by premises device 219. In addition, at step 872, the method 800 include the server 232 receiving the update information. The server can modify the plurality of selectable training models according to the update information.

While for purposes of simplicity of explanation, the respective processes are shown and described as a series of blocks in FIG. 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 9:
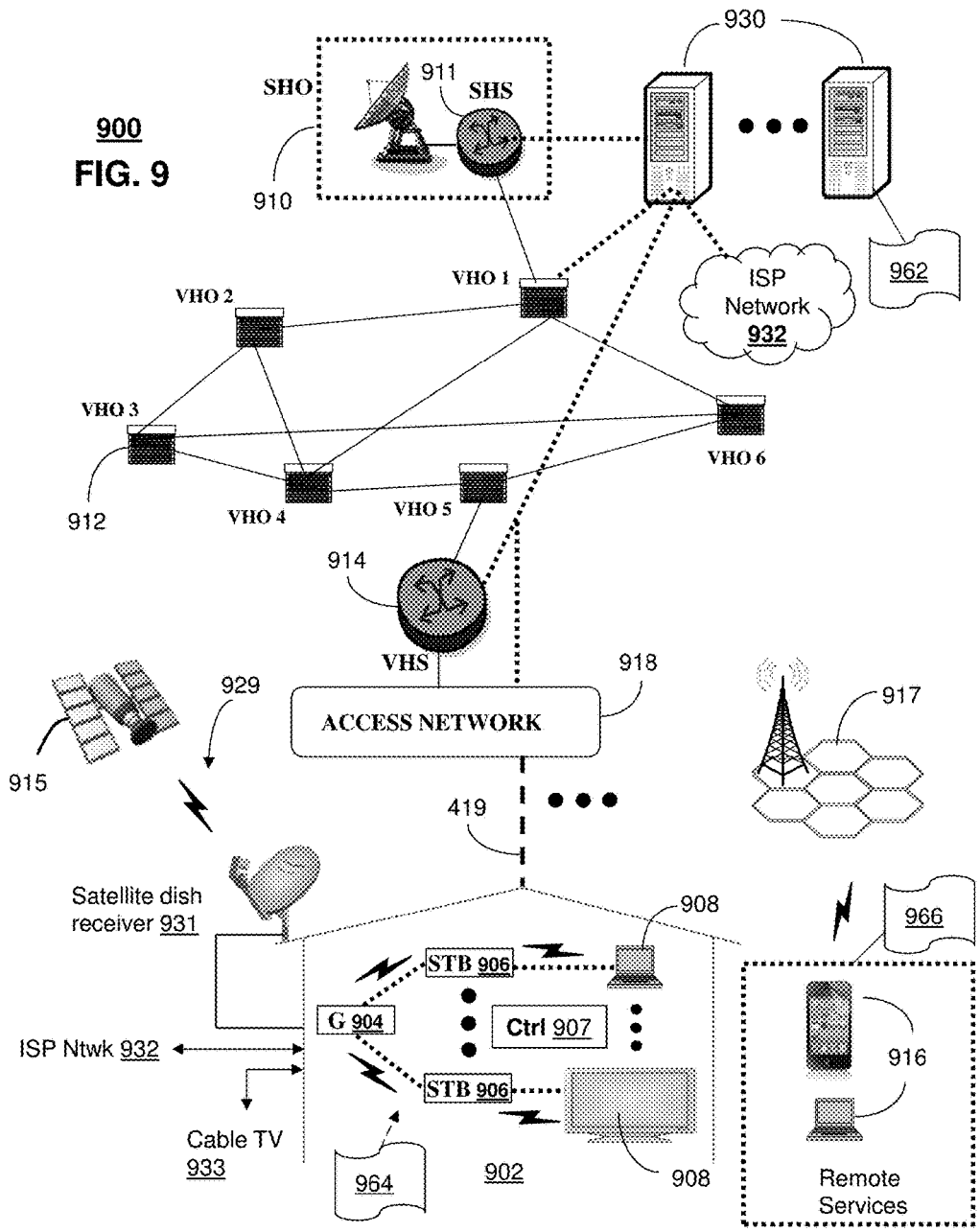
FIGS. 9-10 depict illustrative embodiments of communication systems that provide services for aggregating video content.

FIG. 9 depicts an illustrative embodiment of a first communication system 900 for delivering video content. The communication system 900 can represent an Internet Protocol Television (IPTV) media system. Communication system 900 can be overlaid or operably coupled with system 100 and 200 of FIGS. 1 and 2 as another representative embodiment of communication system 900. For instance, one or more devices 906 and/or 907 illustrated in the communication system 900 of FIG. 9 can aggregate video content and adjust the aggregate video content according to a training model. The adjusted aggregate video content comprises a first subset of the images and does not comprise a second subset of the images from the aggregate video content. The first subset of the images is determined by the training model based on multiple categories corresponding to multiple events. The training model can be provided to device 906 and/or 907 by servers 930. Devices such as 908 and 916 can present the adjusted aggregate video content and receiving identifications for the first subset of the images in the aggregate video content via user-generated input. Further, devices 906 and/or 907 can adjust the training model according to the identifications and provide the adjusted training model to servers 930.

The IPTV media system can include a super head-end office (SHO) 910 with at least one super headend office server (SHS) 911 which receives video content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 414 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a network device or server that manages training models for a group of premises. For instance, function 962 of server 930 can be similar to the functions described for server 232 of FIG. 2 in accordance with method 800 of FIG. 8. The server 930 can use computing and communication technology to perform function of a training model manager 962, which can include among other things, having access to training models from a database, receiving and storing training models generated or adjusted by premises, providing the stored training models, sharing training models from other premises. Further, the server 930 can receive characteristics of the premises to adjust stored training models. In addition, the server 930 can receive user-generated information such as images of persons to update the stored training model. The media processors 906 and wireless communication devices 916 can be provisioned with software functions 964 and 966, respectively, to utilize the services of server 930. For instance, functions 964 and 964 of media processors 906 and wireless communication devices 916 can be similar to the functions described for the premises device 219 and 229 as well communication device 213 of FIG. 2 in accordance with method 800 of FIG. 8.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
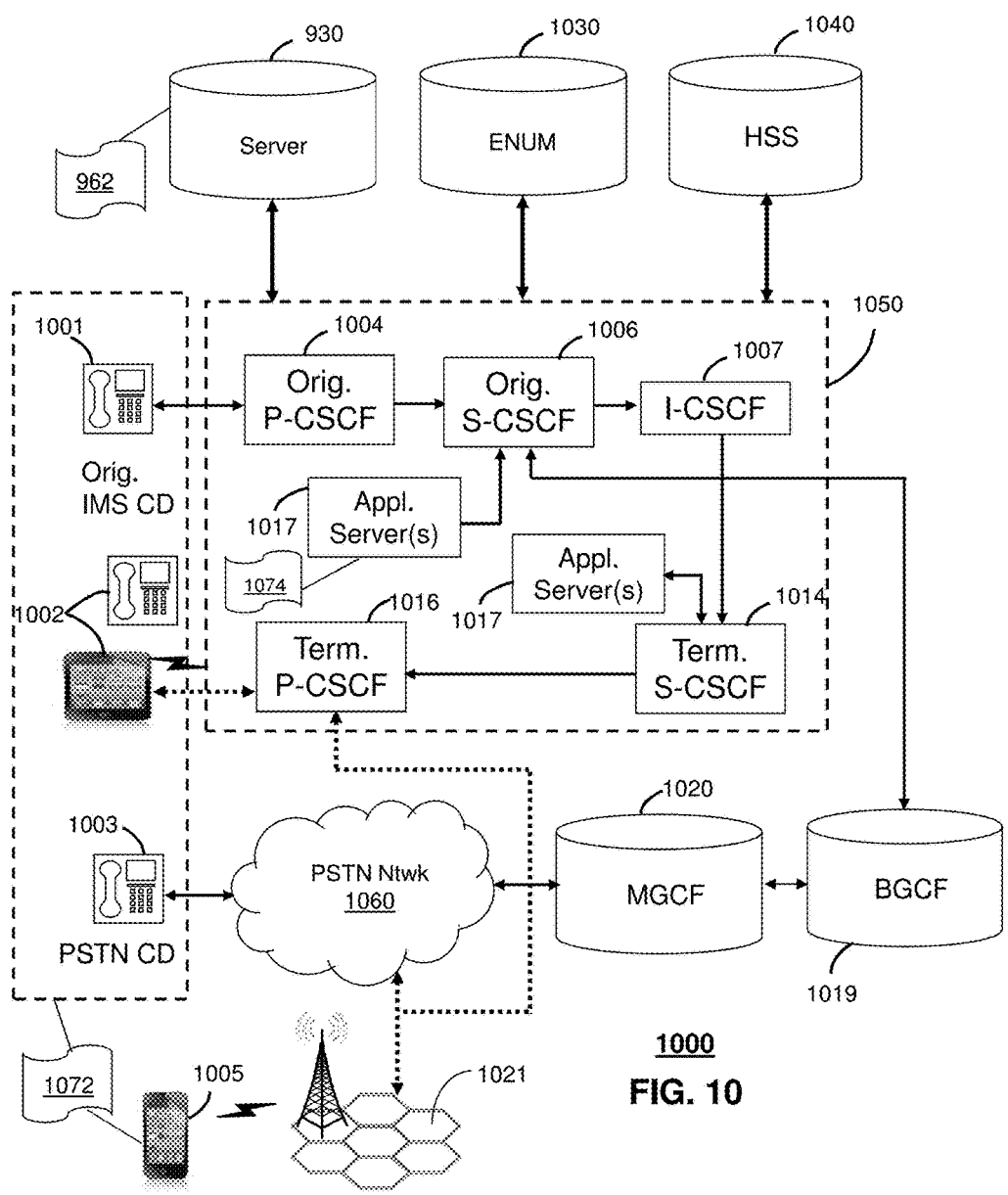

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with system 100 and 200 of FIGS. 1 and/or 2 and communication system 900 as another representative embodiment of communication system 900. Application servers can aggregate video content and adjust the aggregate video content according to a training model. The training model can be generated by the application server according to user-generated input or provided by server 930. The adjusted aggregate video content comprises a first subset of the images and does not comprise a second subset of the images from the aggregate video content. The first subset of the images is determined by the training model based on a plurality of categories corresponding to a plurality of events. Communication device 1005 and 1002 can present the adjusted aggregate video content and provide identifications to the application servers 1017 for the first subset of the images in the aggregate video content. Further, the application servers 1017 can adjust the training model according to the identifications and provide the adjusted training model to server 930.

Communication system 1000 can comprise a Home Subscriber Server (HSS) 1040, a tElephone NUmber Mapping (ENUM) server 1030, and other network elements of an IMS network 1050. The IMS network 1050 can establish communications between IMS-compliant communication devices (CDs) 1001, 1002, Public Switched Telephone Network (PSTN) CDs 1003, 1005, and combinations thereof by way of a Media Gateway Control Function (MGCF) 1020 coupled to a PSTN network 1060. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1006 can submit queries to the ENUM system 1030 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 or CD 1005 (in instances where the cellular phone only supports circuit-switched voice communications), the ENUM system 1030 can respond with an unsuccessful address resolution which can cause the originating S-CSCF 1006 to forward the call to the MGCF 1020 via a Breakout Gateway Control Function (BGCF) 519. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices. In this embodiment, the cellular base station 1021 may communicate directly with the IMS network 1050 as shown by the arrow connecting the cellular base station 521 and the P-CSCF 1016.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The server 930 of FIG. 9 can be operably coupled to communication system 1000 for purposes similar to those described above. Server 930 can perform function 962 and thereby provide training models to application servers 1017 to adjust aggregate video content and then present the adjusted aggregate video content to the CDs 1001, 1002, 1003 and 1005 of FIG. 10, similar to the functions described for premises devices 219 and 229 and server 232 of FIG. 2 in accordance with method 800 of FIG. 8. CDs 1001, 1002, 1003 and 1005, which can be adapted with software to perform function 1072 to utilize the services of the premises devices 219 and 229 as well as server 930 similar to the functions described for communication device 213 of FIG. 2 in accordance with method 800 of FIG. 8. Server 930 can be an integral part of the application server(s) 1017 performing function 1074, which can be substantially similar to function 962 and adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
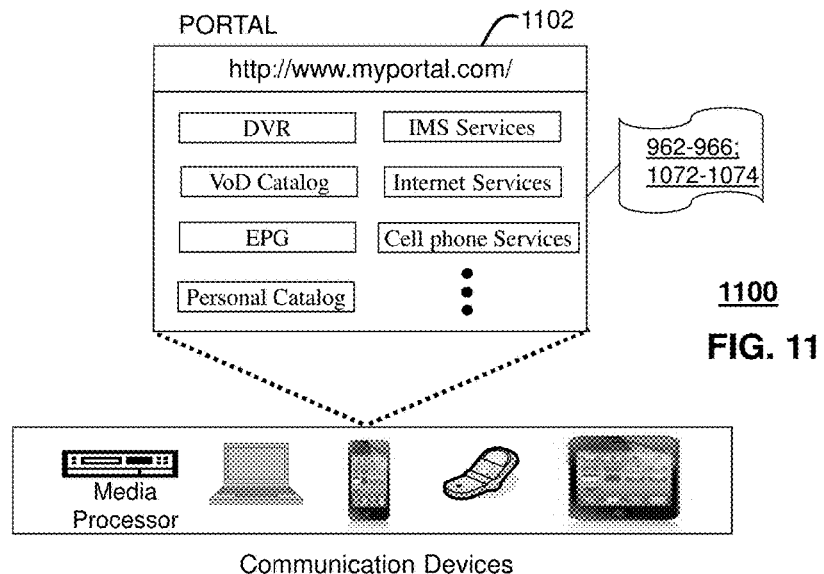
FIG. 11 depicts an illustrative embodiment of a web portal for interacting with the communication systems of aggregating video content.

FIG. 11 depicts an illustrative embodiment of a web portal 1102 of a communication system 1100. Communication system 1100 can be overlaid or operably coupled with systems 100 and 200 of FIGS. 1 and 2, communication system 900, and/or communication system 1000 as another representative embodiment of systems 200 and 200 of FIGS. 1 and 2, communication system 900, and/or communication system 1000. The web portal 1102 can be used for managing services of aggregating captured video content and adjusting the aggregate video content by systems 100 and 200 of FIGS. 1 and 2 and communication systems 900-10000. A web page of the web portal 1102 can be accessed by a Uniform Resource Locator (URL) with an Internet browser using an Internet-capable communication device such as those described in FIG. 2 and FIGS. 9-10. The web portal 1102 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1102 can also be used for provisioning IMS services described earlier, provisioning Internet services, provisioning cellular phone services, and so on.

The web portal 1102 can further be utilized to manage and provision software applications 962-966, and 1072-1074 to adapt these applications as may be desired by subscribers and/or service providers of systems 100 and 200 of FIGS. 1 and 2, and communication systems 900-1000. For instance, users of services for managing captured video content from surveillance cameras provided by server 232 or server 930 can log into their on-line accounts and provision the premises devices 219 and 229 as well server 232 or server 930 with characteristics of the premises, images objects including persons to adjust training models applied to the aggregate video content, a predetermined threshold of the size of adjusted video content to review and so on. Service providers can log onto an administrator account to provision, monitor and/or maintain the systems 100 and 299 of FIGS. 1 and 2 or server 930.

Figure 12:
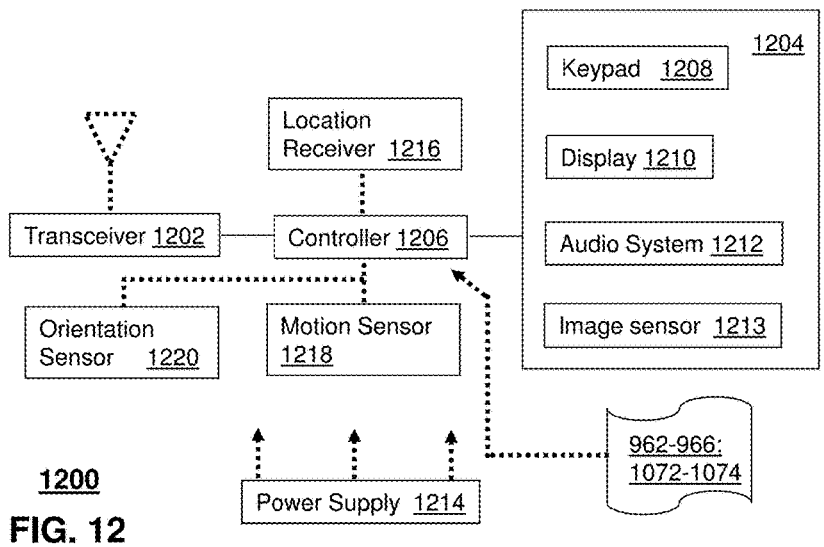
FIG. 12 depicts an illustrative embodiment of a communication device used in systems for aggregating video content.

FIG. 12 depicts an illustrative embodiment of a communication device 1200. Communication device 1200 can serve in whole or in part as an illustrative embodiment of the premises devices 219 and 2219 as well as communication device 213 depicted in FIG. 2, and FIGS. 9-10 and can be configured to perform portions of method 800 of FIG. 3.

Communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or less of the circuit components shown in FIG. 12. These variant embodiments can be used in one or more embodiments of the subject disclosure.

The communication device 1200 can be adapted to perform the functions of premises devices 219 and 229 as well as communication device 213 of FIG. 2, the media processor 906, the media devices 908, or the portable communication devices 916 of FIG. 9, as well as the IMS CDs 1001-1002 and PSTN CDs 1003-1005 of FIG. 5. It will be appreciated that the communication device 1200 can also represent other devices that can operate in systems 100 and 200 of FIGS. 1 and 2, communication systems 900-1000 of FIGS. 9-12 such as a gaming console and a media player. In addition, the controller 1206 can be adapted in various embodiments to perform the functions 962-966 and 1072-1074, respectively.

Upon reviewing the aforementioned embodiments, it would be evident to an artisan with ordinary skill in the art that said embodiments can be modified, reduced, or enhanced without departing from the scope of the claims described below. For example, a person of ordinary skill in the art would understand to combine portions of some embodiments with portions of other embodiments. Further, portions of embodiments can also be implemented. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
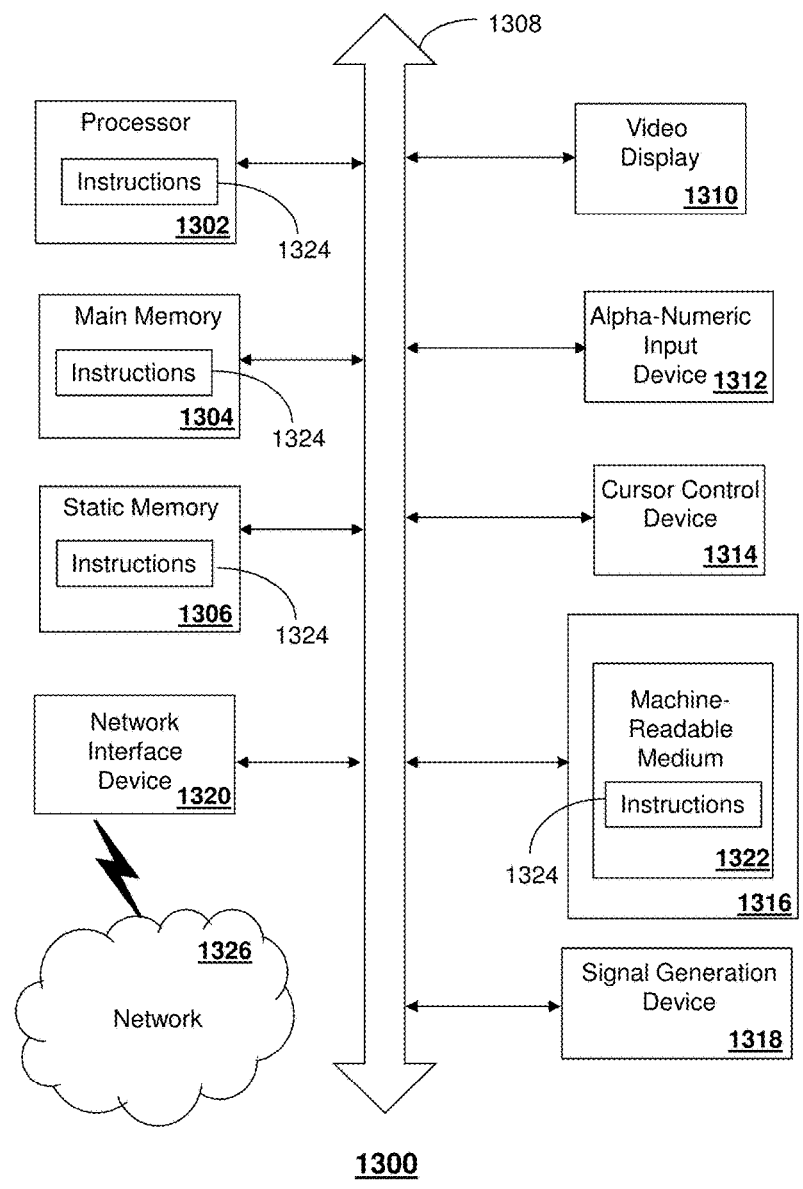
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. One or more instances of the machine can operate, for example, as the premise devices 219 and 229, server 232, communication device 213 and server 930, the media processor 906, communication devices 908, 916, 1005, and 1002 and other devices of FIGS. 1-12. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU)), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
 a processing system including a processor; and
 a memory that stores executable instructions that, when executed by the processing system, facilitate performance of operations, comprising:
  aggregating video content from a plurality of cameras associated with a premises to generate aggregated video content for the premises, wherein the video content includes images of a plurality of events observed by the plurality of cameras;
  analyzing the aggregated video content according to a training model to generate adjusted aggregated video content including a first subset of images while excluding a second subset of the images, wherein the first subset of images is determined by the training model based on a plurality of characteristics for the premises;
  presenting the adjusted aggregated video content including the first subset of images;
  receiving user-generated input for the adjusted aggregated video content, wherein the user-generated input provides identifications for the first subset of the images in the aggregated video content as the plurality of characteristics for the premises; and
  adjusting the training model according to the user-generated input resulting in an adjusted training model.

2. The device of claim 1, wherein the plurality of characteristics for the premises includes neighborhood events, neighborhood information, neighbor information, and delivery event information.

3. The device of claim 1, wherein the second subset of the images is determined by the training model based on the plurality of characteristics for the premises.

4. The device of claim 1, wherein the operations further comprise providing the adjusted training model to a network, and wherein the analyzing the aggregated video content further comprising applying the adjusted training model to the aggregated video content.

5. The device of claim 4, wherein the operations further comprise:
 receiving a plurality of selectable training models from the network, wherein one of the plurality of selectable training models is generated by a premises device of a third party premises, and wherein the third party premises is associated with the premises;
 providing a list of the plurality of selectable training models to a user interface; and
 obtaining an indication of a selected training model from the list of the plurality of selectable training models via the user interface.

6. The device of claim 5, wherein the operations further comprise:
 receiving update information for the plurality of selectable training models; and
 providing the update information to the network, wherein the network modifies the plurality of selectable training models according to the update information.

7. The device of claim 4, wherein the operations further comprise analyzing the adjusted aggregated video content according to the adjusted training model to edit the adjusted aggregated video content to include a third subset of the images while excluding a fourth subset of the images.

8. The device of claim 1, wherein the analyzing the aggregated video content further comprises identifying a motion of an object in an images of the images of the plurality of events.

9. The device of claim 8, wherein the identifying the motion of the object further comprises identifying the object as a person and determining if the person is associated with the premises.

10. The device of claim 9, wherein the determining whether the person is associated with premises further comprises transmitting an alarm notification responsive to determining that the person is not associated with the premises.

11. A machine-readable storage medium, comprising executable instructions that, when executed by a processing system including a processor, facilitate performance of operations, comprising:
 receiving video content from a plurality of cameras associated with a premises;
 generating aggregated video content for the premises from images of a plurality of events from the plurality of cameras;
 analyzing the aggregated video content according to a training model to generate adjusted aggregated video content including a first subset of images while excluding a second subset of the images, wherein the first subset of images is determined by the training model based on a plurality of characteristics for the premises;
 providing the adjusted aggregated video content including the first subset of images for presentation at a media processor associated with the premises;
 receiving user-generated input for the adjusted aggregated video content, wherein the user-generated input provides identifications for the first subset of the images in the aggregated video content as the plurality of characteristics for the premises; and
 adjusting the training model according to the user-generated input resulting in an adjusted training model.

12. The machine-readable storage medium of claim 11, wherein the analyzing the aggregated video content further comprises identifying a motion of an object in the first subset of images.

13. The machine-readable storage medium of claim 12, wherein the operations further comprise analyzing the object, wherein the object is determined to be a vehicle that has approached the premises, and wherein the vehicle is identified as being associated with the premises.

14. The machine-readable storage medium of claim 12, wherein the operations further comprise analyzing the object to identify the object as a person and determining whether the person is associated with the premises.

15. The machine-readable storage medium of claim 14, wherein the operations further comprise transmitting an alarm notification responsive to determining that the person is not associated with the premises.

16. A method, comprising:
 aggregating, by a processing system comprising a processor, video content from a plurality of cameras to generate aggregated video content for the plurality of cameras;
 analyzing, by the processing system, the aggregated video content according to a training model to generate adjusted aggregated video content to include first video content from the plurality of cameras while excluding second video content from the plurality of cameras;

sending, by the processing system, the adjusted aggregated video content to a display device associated with the processing system;

receiving user-generated input for the adjusted aggregated video content, wherein the user-generated input provides identifications for first video content in the aggregated video content; and adjusting the training model according to the user-generated input resulting in an adjusted training model.

17. The method of claim 16, further comprising providing the adjusted training model to a network, wherein the analyzing the aggregated video content further comprises applying the adjusted training model to the aggregated video content.

18. The method of claim 17, further comprising:

receiving a plurality of selectable training models from a network, wherein one of the plurality of selectable training models is generated by a premises device of a third party premises, and wherein the third party premises is associated with the processing system;

providing a list of the plurality of selectable training models to a user interface; and obtaining an indication of the training model from the list of the plurality of selectable training models via the user interface.

19. The method of claim 16, further comprising:

identifying a plurality of characteristics for a premises associated with the processing system; and providing the plurality of characteristics to a network, wherein the training model is received from the network based on the plurality of characteristics.

20. The method of claim 19, wherein the plurality of characteristics for the premises includes neighborhood events, neighborhood information, neighbor information, visitor information, and delivery event information.

* * * * *